Patented June 25, 1940

2,205,792

UNITED STATES PATENT OFFICE 2,205,792

RECOVERY OF SILVER FROM SPENT PHOTOGRAPHIC SOLUTIONS

Garnet Philip Ham, Riverside, Conn., assignor to American Cyanamid Company, New York, N. Y., a corporation of Maine No Drawing. Application April 4, 1940, Serial No. 327,783

6 Claims. (Cl. 75—108)

This invention relates to the recovery of silver from spent photographic solutions containing silver compounds and particularly from spent fixing solutions.

The problem of spent fixing solutions is a very serious one in the photographic industry because when these solutions have dissolved a comparatively small amount of silver, they can no longer be used, but the silver concentration is so low that its recovery is difficult. It has been proposed in the past to precipitate silver electrolytically and some plants utilizing this method are in commercial operation. The process requires expensive equipment and skilled operating personnel and is only usable by large photographic concerns such as motion picture film processing establishments and the like, and especially where large volumes of solutions are concerned.

It has been proposed to precipitate silver chemically for example by the addition of a more electro-positive metal such as zinc. These processes have not proven entirely satisfactory and are not in general used, the electrolytic method being the only one which has achieved any degree of commercial success.

The present invention deals with a chemical process of recovering silver from spent fixing solutions and similar solutions containing dissolved silver salts. I have found that the salts of esters of xanthic acid precipitate silver in the form of a complex and this precipitation is effected in a fairly short time, for example, overnight or less. An important advantage of the present invention is that the silver precipitation is not affected adversely by the presence of gelatin and other contaminating products in the spent solution. The present process is therefore normally applicable to spent solutions which have not been subjected to preliminary treatment, for example, filtration and the like, to remove gelatin and similar organic colloids, although where the course of preliminary removal is justifiable, the present process can be used on the clarified solution. In a more specific aspect the present invention also includes a specific method of removing gelatin prior to treatment with the xanthate.

Another advantage of the present invention lies in the fact that the precipitation of the silver is in a form which can be readily separated by decantation and the like, and there is practically no tendency to form a colloidal solution of silver.

The present invention is not concerned with any critical proportions of xanthate. In general, however, some excess of that theoretically required to react with the silver in the bath is desirable. A larger excess does not particularly harm the reaction, but is not necessary.

The silver precipitate obtained by the present invention can be readily treated by furnace or other means to recover the silver. In the case of fixers it is noticeable that the precipitate contains a considerable amount of bromides and under suitable conditions it is possible to recover the bromine values therefrom.

While the present invention is especially useful in the treatment of spent fixing solutions, it is also applicable to other waste solutions from photographic manufacture such as wash water from emulsion manufacture, wash waters from paper manufacture, and wash waters from scrap film burners. The present invention precipitates silver effectively from these solutions, but its advantage is here not as great as in the treatment of spent fixing solutions because other chemical methods can be used in some cases.

Spent developers are not in general economically suitable for treatment by the present invention. While silver is precipitated, and precipitated effectively, the amount of silver which is present in the developer is normally too small to render its recovery worth while and the developer cannot be reused after treatment.

In the case of spent fixers the present invention recovers the silver and appears to increase the remaining available thiosulfate content of the fixer. It is possible to use the fixer from which silver has been removed for fortification of fresh fixer, and even in some cases to reuse the fixing solution to fix photographic material. It is not possible to regenerate the fixing bath to the point where it possesses the same characteristics as when new, and in general the regenerated fixer is more efficiently used in admixture with fresh fixing solution.

The percentage of recovery of the silver values varies to some extent with time. However, most of the recoverable silver can be precipitated by standing overnight but the additional recovery obtainable by longer standing is rarely of sufficient importance to warrant tying up the equipment. However, this is purely a matter of economics and the present invention may therefore be used with longer or shorter standing times depending on the economics of the silver recovery, taking into consideration the price of silver and other factors involved. This is an important advantage of the present invention in that no critical operating procedure or operating time is required, and in a small establishment the process can be run overnight without any supervision which greatly reduces the cost and makes it available to photographic establishments of a size which would normally be considered too small to undertake silver recovery at all.

I have found that within wide limits the nature of the alcohol in the xanthate ester does not play any particular part. Thus it is possible to use salts of the lower alkyl xanthates such as ethyl, isopropyl, butyl, and the like, or higher xanthates such as the amyl can be used as can cyclic esters such as cyclohexyl xanthate and the like. For practical purposes the cheaper lower xanthates are preferred because the additional cost of the higher xanthates is not warranted since they do not give materially improved results. While therefore the present invention is not limited to the lower alkyl xanthates, these are preferred from the economics standpoint.

The nature of the xanthate salt is also not critical and advantageously either the potassium salts or the sodium salts may be used. It is desirable to use a xanthate of fairly good quality but it does not have to be chemically pure. On the contrary, a good grade of flotation xanthate such as 90% sodium or potassium ethylxanthate, isopropyl, butyl, or amyl xanthate may be used. Where it is desired to reuse the spent solutions after silver precipitation, purity of the xanthate is of somewhat greater importance and in such cases it is desirable to use a xanthate of at least 90% purity and even higher purity is desirable because there is less contamination of the treated solutions with impurities from the xanthate.

The invention will be described in greater detail in conjunction with the following specific examples which are typical illustrations, but the invention is not limited to the exact details therein set forth:

Example 1

An Eastman F-10 acid hardening and fixing bath was exhausted by processing spectrographic photographic process plates until the analysis of the solution showed 1.44 grams of silver per 100 cc. The solution contained approximately 5% by volume of degraded gelatin or other organic matter.

The spent solution was treated with 15 grams of potassium ethyl xanthate per liter of solution. A silver complex formed almost immediately and after some vigorous stirring the solution was permitted to stand overnight for about 15 hours. At the end of this period a complex silver xanthate precipitate had settled to the bottom of the container and the supernatent liquid was clear. This was decanted off and the precipitate was recovered by filtration. After drying, the unwashed precipitate amounted to 67.5 grams per liter of original spent solution and assayed 15.8% silver. This corresponds to about 1.3 ounces of silver per gallon and is approximately 73.6% recovery of the silver originally in the solution. Longer standing tends to increase the recovery somewhat but the increase is too small to warrant going beyond 15 hours. The sodium thio-sulfate content of the treated solution was materially increased and considerable regeneration was effected. The degree of regeneration was shown as follows: The spent solution required 6 minutes at 24° C. to clear a 5 x 7 orthoportrait film. After treatment with xanthate the same type of film was cleared in less than 3 minutes at 34° C. The regenerated fixer can be used as such or when extreme fixing is not necessary, but it is preferably mixed with further fresh fixing solutions.

The precipitate obtained as described above can be treated for recovery of silver by any of the normal methods, for example by mixing with a flux and heating the mixture to 1500-1900° F. and cupelling if necessary to obtain the silver in metallic form. The slag produced may be treated for recovery of bromide by various leaching processes.

Example 2

A spent fixing bath as described in Example 1 was treated with 15 grams per liter of sodium isopropyl xanthate, flotation grade, containing between 93 and 94% xanthate. A silver complex formed immediately and after standing overnight for 15 hours, separated out readily as a precipitate which settled to the bottom of the container leaving a clear supernatent liquid. On decanting and filtering the precipitate, it was found that the recovery of silver was substantially the same as in Example 1. The clear solution is usable for further fixing or for fortification of addition amounts of fresh fixer.

The efficiency of recovery of the isopropyl xanthate is substantially the same as that of the potassium ethyl xanthate and the rate of precipitation is, if anything, faster. Similar results are obtained with higher xanthates such as the secondary butyl, amyl, and the like.

The small amount of impurities in the commercial grade of xanthate do not appear to adversely affect the fixing power of the clear solution, which was as effective as that obtained from Example 1.

The above examples describe the treatment of spent fixing solutions directly without preliminary removal of gelatin particles. In some cases where the amount of gelatin particles is large it is desirable to remove them prior to treatment with xanthate. This may be effected with any suitable means and I have found that a very efficient way is to pass the exhausted solution through a tank or other container of relatively great height to diameter, for example a container with height five times its diameter. 5% of a mixture of molasses with 5% of a wetting agent such as a 10% solution of sodium dioctylsulfosuccinate is generally introduced through the top of the solution in the tank and sinks to the bottom carrying with it a large proportion of the gelatin so that the supernatant spent solution after 12 hours standing is free from visible gelatin particles. The molasses treatment does not adversely affect the subsequent precipitation of silver.

What I claim is:

1. A method of recovering silver values from spent photographic solutions which comprises subjecting the spent solution to the action of a soluble salt of an ester of xanthic acid, permitting a precipitate of silver complex to form and removing the precipitate.

2. A method of recovering silver values from spent photographic fixing solutions which comprises subjecting the spent solution to the action of a soluble salt of an ester of xanthic acid, permitting a precipitate of silver complex to form and removing the precipitate.

3. A method of recovering silver values from spent photographic solutions which comprises subjecting the spent solution to the action of an alkali metal alkyl xanthate, permitting a precipitate of silver complex to form and removing the precipitate.

4. A method of recovering silver values from spent photographic fixing solutions which comprises subjecting the spent solution to the action of an alkali metal alkyl xanthate, permitting a precipitate of silver complex to form and removing the precipitate.

5. A method of recovering silver values from spent photographic fixing solutions which comprises subjecting the spent solution to the action of an alkali metal ethyl xanthate, permitting a precipitate of silver complex to form and removing the precipitate.

6. A method of recovering silver values from spent photographic fixing solutions which comprises subjecting the spent solution to the action of an alkali metal propyl xanthate, permitting a precipitate of silver complex to form and removing the precipitate.

GARNET PHILIP HAM.

CERTIFICATE OF CORRECTION.

Patent No. 2,205,792.　　　　　　　　　　　　　June 25, 1940.

GARNET PHILIP HAM.

It is hereby certified that error appears in the printed specification of the above numbered patent requiring correction as follows: Page 2, first column, line 73, for "34° C." read --24° C.--; and that the said Letters Patent should be read with this correction therein that the same may conform to the record of the case in the Patent Office.

Signed and sealed this 30th day of July, A. D. 1940.

(Seal)

Henry Van Arsdale,
Acting Commissioner of Patents.